United States Patent
Kamdar (10) Patent No.: US 8,521,124 B2
(45) Date of Patent: Aug. 27, 2013

(54) ENHANCED EMERGENCY SERVICES IN FIXED WIRELESS NETWORKS

(75) Inventor: Kamlesh S. Kamdar, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 703 days.

(21) Appl. No.: 12/707,733

(22) Filed: Feb. 18, 2010

(65) Prior Publication Data

US 2011/0201299 A1    Aug. 18, 2011

(51) Int. Cl.
| | |
|---|---|
| *H04M 11/04* | (2006.01) |
| *H04M 3/42* | (2006.01) |
| *H04M 3/493* | (2006.01) |
| *H04M 3/08* | (2006.01) |
| *H04M 3/22* | (2006.01) |
| *H04M 1/24* | (2006.01) |
| *H04W 24/00* | (2009.01) |
| *G05D 1/00* | (2006.01) |
| *G05D 3/00* | (2006.01) |
| *G06F 7/00* | (2006.01) |
| *G06F 17/00* | (2006.01) |
| *B60T 7/12* | (2006.01) |
| *G01S 19/17* | (2010.01) |

(52) U.S. Cl.
USPC ............... 455/404.1; 455/404.2; 455/414.2; 455/456.1; 455/521; 379/33; 379/37; 379/45

(58) Field of Classification Search
USPC ......... 455/404.2, 414.2, 456.1, 404.1; 701/1, 701/76, 97, 107, 400, 408–412, 425, 438, 701/446, 454, 468; 342/357.55; 379/33, 379/37, 45
See application file for complete search history.

(56) References Cited

U.S. PATENT DOCUMENTS

| | | | |
|---|---|---|---|
| 2003/0012344 A1* | 1/2003 | Agarwal et al. | 379/37 |
| 2004/0266398 A1* | 12/2004 | Adamczyk et al. | 455/412.1 |
| 2005/0179607 A1 | 8/2005 | Gorsuch et al. | |
| 2007/0173303 A1 | 7/2007 | Viorel et al. | |
| 2008/0133336 A1* | 6/2008 | Altman et al. | 705/10 |
| 2008/0146205 A1* | 6/2008 | Aaron | 455/414.2 |
| 2010/0311321 A1 | 12/2010 | Norin | |
| 2010/0313232 A1 | 12/2010 | Norin | |

* cited by examiner

*Primary Examiner* — Anthony Addy
*Assistant Examiner* — Munsoon Choo (57) ABSTRACT

A computing device receives a location inquiry for a user device, the location inquiry including an identifier for the user device, and retrieves fixed location data associated with the identifier. The computing device also obtains, from the user device, current geographic location data for the user device and calculates a difference between the fixed location data and the current geographic location data. The computing device selects, from a group of threshold values, a particular threshold value for the calculated difference between the fixed location data and the current geographic location data. The computing device responds to the location inquiry using the fixed location data when the difference between the fixed location data and the geographic location data is within the particular threshold and otherwise responds to the location inquiry using the current geographic location data.

22 Claims, 10 Drawing Sheets

ENHANCED EMERGENCY SERVICES IN FIXED WIRELESS NETWORKS

BACKGROUND INFORMATION

Enhanced 911 (or E911) service is a feature of the 911 emergency-calling system that automatically associates a physical address with a calling party's Automatic Number Identification (ANI). The enhanced 911 service provides emergency responders with the location of the emergency without the calling party having to provide it. A final destination of a 911 call (e.g., where the 911 operator is located) is referred to as a Public Safety Answering Point (PSAP). A calling party number (CPN) may be used to determine the ANI associated with the calling party. The ANI may be used to look up an address of the calling party, associated with the ANI, in a third party Automatic Location Identification (ALI) database that is secure and separate from the public telephone network. The determined address of the calling party may be used to locate the closest PSAP to the calling party in the emergency situation. The PSAP may receive emergency (or 911) calls and associated address information, and may respond to the emergency accordingly.

To enable E911 services for voice over Internet protocol (VoIP) subscribers, the VoIP subscribers must register their locations of their VoIP devices with a service provider for storage in regional ALI databases. When a VoIP subscriber makes a 911 call, the regional ALI databases may be queried to assist in accurate PSAP determination and to provide an emergency operator with the VoIP subscriber's location and callback number. Use of ALI databases assumes that a phone or device associated with the CPN is not taken to another location without re-provisioning service. However, in the case of wireless devices simulating wireline services (e.g., fixed wireless devices), a subscriber's VoIP device may be portable. If the VoIP subscriber becomes mobile, inaccurate location identification may be provided to the PSAP during an emergency call. Similarly, non-emergency services providers may offer other location-sensitive services for VoIP subscribers using portable devices, while still relying solely on the street address provided by the customer at the time of service activation.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
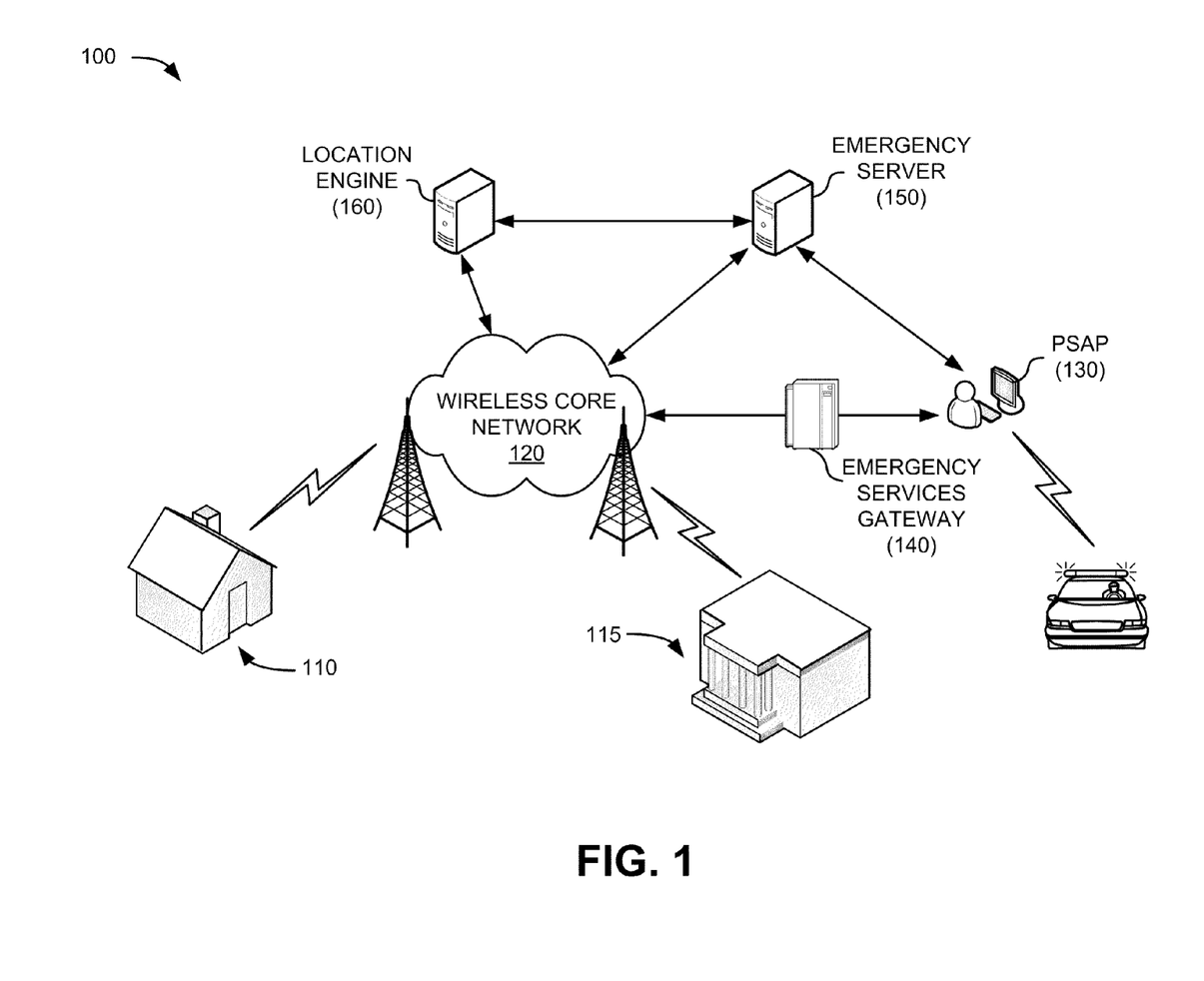
FIG. 1 provides an overview of concepts described herein.

Implementations described herein may include systems and/or methods that provide intelligence to detect when a fixed wireless device is relocated and further identify the location of the fixed wireless device based on wireless location methods, even though the location-dependent services (e.g., E911 services) provided are wireline equivalent. FIG. 1 provides an overview of concepts described herein.

As shown in FIG. 1, a user of a fixed wireless device may place an E911 call from one of various locations, such as a designated location (e.g., a home 110) that may be registered with a location/emergency service, or an another location (e.g., an office 115) that is not registered with the location/emergency service. For any given call, the user may be (1) using the wireless device at a different location than the designated location, (2) calling from a designated location that has not yet been updated in the location database (e.g., there is lead time to provision the database), or (3) calling from a designated location that is listed incorrectly in the location database (e.g., due to a data entry error).

When a user initiates the call, a wireless core network 120 may identify the call as an E911 call (or another location-relevant type of call) and forward an indication of the call to an emergency server 150 and a location engine 160 (which may be within or separate from wireless core network 120). The location engine 160 may communicate with the user device (e.g., via wireless core network 120) to receive parameters of location determination services deployed by the user's wireless carrier. Location engine 160 may communicate with the user device so that the location determination may be independent of positioning methods as well as particular wireless networks. Location engine 160 may verify street address information (e.g., the designated location associated with the user device) with location calculations based on wireless methods. If the street address is too far from (e.g., outside a particular threshold) the wireless location calculation, location engine 160 may use the location calculated based on wireless parameters and ignore the street address. As described further herein, the location-related thresholds may vary based on what type of positioning method was used to calculate position.

In the example of FIG. 1, assuming an E911 call was placed from a non-designated location (e.g., office 115), location engine 160 may forward the selected location information (e.g., the calculated location of office 115) to emergency server 150 for emergency server 150 to identify (e.g., based on the calculated location information) an appropriate PSAP 130 to receive the call from the user device. Wireless core network 120 may then route the call to PSAP 130, via an emergency services gateway 140, and PSAP 130 may appropriately respond to the call. Thus, emergency responders may be appropriately directed to office 115, instead of the designated location at home 110. Details of wireless core network 120, PSAP 130, emergency services gateway 140, emergency server 150, and location engine 160 are provided below, for example, in connection with FIG. 2.

Figure 2:
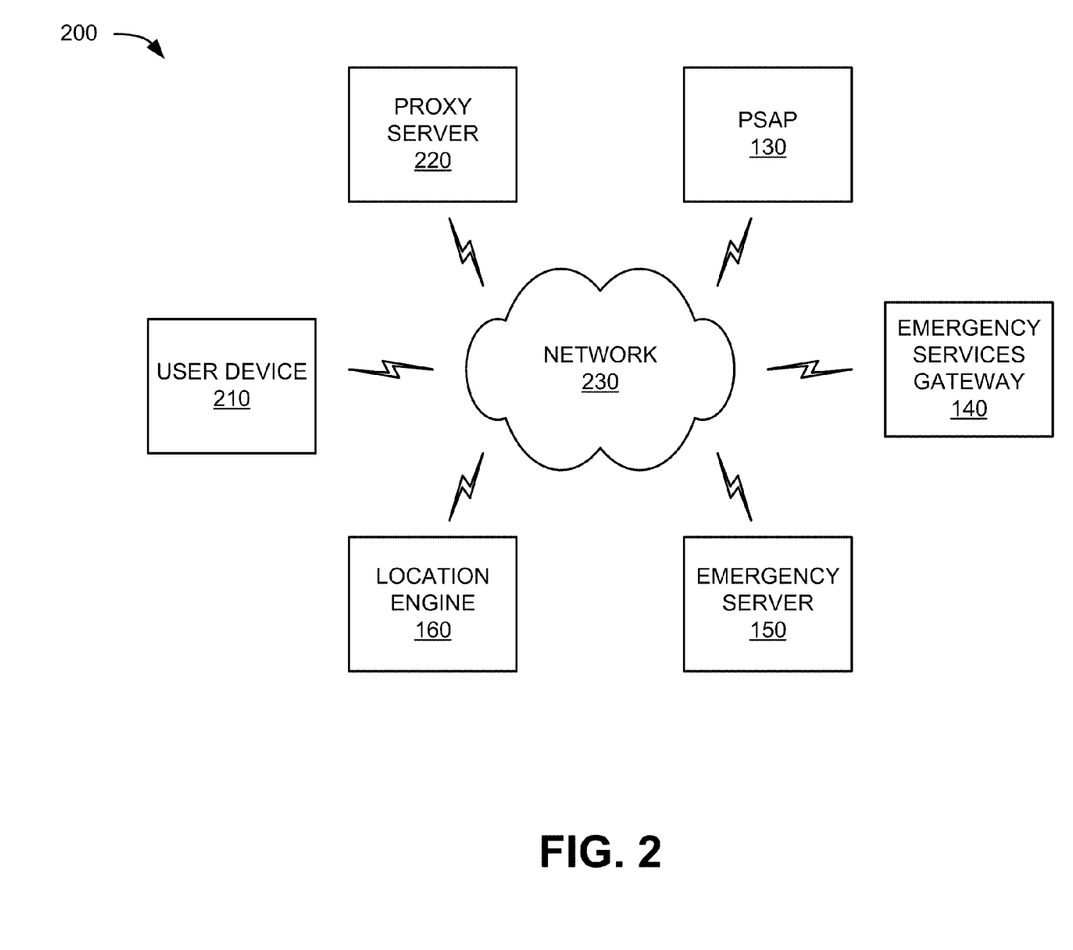
FIG. 2 is an exemplary diagram of a network in which systems and methods described herein may be implemented.

FIG. 2 is a diagram of an exemplary network 200 in which systems and/or methods described herein may be implemented. As illustrated, network 200 may include a user device 210, a proxy server 220, PSAP 130, emergency services gateway 140, emergency server 150, and location engine 160, all interconnected by a network 230. Components of network 200 may interconnect via wired and/or wireless connections. One user device 210, proxy server 220, PSAP 130, emergency services gateway 140, emergency server 150, location engine 160, and network 230 have been illustrated in FIG. 2 for simplicity. In practice, there may be more user devices 210, proxy servers 220, PSAPs 130, emergency services gateways 140, emergency servers 150, location engines 160, and/or networks 230. Also, in some instances, one or more of the components of network 200 may perform one or more functions described as being performed by another one or more of the components of network 200.

User device 210 may include an adaptor unit (e.g., a VoIP adaptor), a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a personal computer, a VoIP-based device, and/or other types of computation or communication devices. In one implementation, user device 210 may include any device that is capable of initiating an E911 call. In another implementation, user device 210 may also be configured to communicate directly or indirectly with location engine 160 to identify a best-available position determining method for user device 210 and to provide real-time (or near real-time) geographic position information. User device 210 may also be configured to store threshold variables associated with the accuracy of each available position determining method for user device 210.

Proxy server 220 may include one or more server devices, or other types of computation or communication devices, that gather, process, search, and/or provide information in a manner described herein. In one implementation, proxy server 220 may include a server (e.g., a computer system or an application) capable of servicing client requests by forwarding the requests to other servers. For example, proxy server 220 may receive an E911 call from user device 210 and may query a server (e.g., redirect server 140) for route information (e.g., relating to routing the E911 call throughout network 200) associated with E911 call. In exemplary implementations described herein, proxy server 220 may be included within wireless core network 120 of FIG. 1.

PSAP 130 may include one or more devices that are responsible for answering emergency calls for emergency assistance from, e.g., police, fire, ambulance and/or other services. PSAP 130 may include one or more user devices, network devices, and/or other communication devices that service emergency calls. In one implementation, PSAP 130 may receive emergency calls from wireless core network 120 via Multi-Frequency (MF) trunks, digital trunks, ISDN User Part (ISUP) trunks controlled by the SS7 protocol, basic 911 trunks, E911 trunks, VoIP, Intranet, Internet, etc. In another implementation, PSAP 130 may communicate with emergency personnel (e.g., police, fire, and/or ambulance services) (not shown) to provide information associated with emergency calls.

Emergency services gateway 140 may include a data transfer device, such as a gateway, a router, a switch, a firewall, a bridge, a proxy server, a server, a device providing domestic switching capabilities, or some other type of device that processes and/or transfers data. In one implementation, emergency services gateway may operate on data on behalf of a network (e.g., wireless core network 120 and/or network 230) and may serve as an entrance to another network (e.g., an emergency services network of multiple PSAPs 130).

Emergency server 150 may include one or more server devices, or other types of computation or communication devices, that gather, process, search, and/or provide information in a manner described herein. In one implementation, emergency server 150 may receive (e.g., from proxy server 220) an indication of an E911 call, receive a location determination (e.g., from location engine 160), and identify the proper PSAP 130 to route call to, based on the location determination.

Location engine 160 may include one or more server devices, or other types of computation or communication devices, that gather, process, search, and/or provide information in a manner described herein. In one implementation, location engine 160 may collect and provide previously-stored and/or real-time (or near real-time) location information for user device 210. Location engine 160 may communicate with user device 210 to identify a best-available location determination method for user device 210 and then to retrieve location information obtained using the best-available method. In some implementations, location information may be, for example, global positioning system (GPS) information or another form of global navigation satellite system (GNSS) information collected from a mobile communications device (e.g., user device 210). In another implementation, location information may be in the form of cellular tower triangulation information collected from the mobile communications device. In still other implementations, location information may be in the form of a single tower or base station location collected from the mobile communications device.

Location engine 160 may also identify location information for user device 210 in the form of a fixed address or location associated with a subscriber's account. Fixed user device location information may be provided by subscribers, for example, at the time of registering for telephone and/or multimedia services. Fixed location information for user devices may be stored in a memory of location engine 160 or in a remote device, such a database, accessible by location engine 160. In on example, fixed location information may include an automatic location identification (ALI) database associated with location engine 160. The ALI database may include one or more databases that map calling phone numbers (CPNs) or ANIs to a street addresses and/or emergency service numbers (ESNs). Location engine 160 is described further in connection with, for example, FIGS. 4-7.

Network 230 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network (e.g., wireless GSM, wireless CDMA, etc.), any network supporting emergency call services (e.g., a VoIP network with mobile and/or fixed locations, a wireline network, etc.), or a combination of networks. In one implementation, network 230 may include wireless core network 120, an emergency services network connecting multiple PSAPs 130, and one or more other networks.

Figure 3:
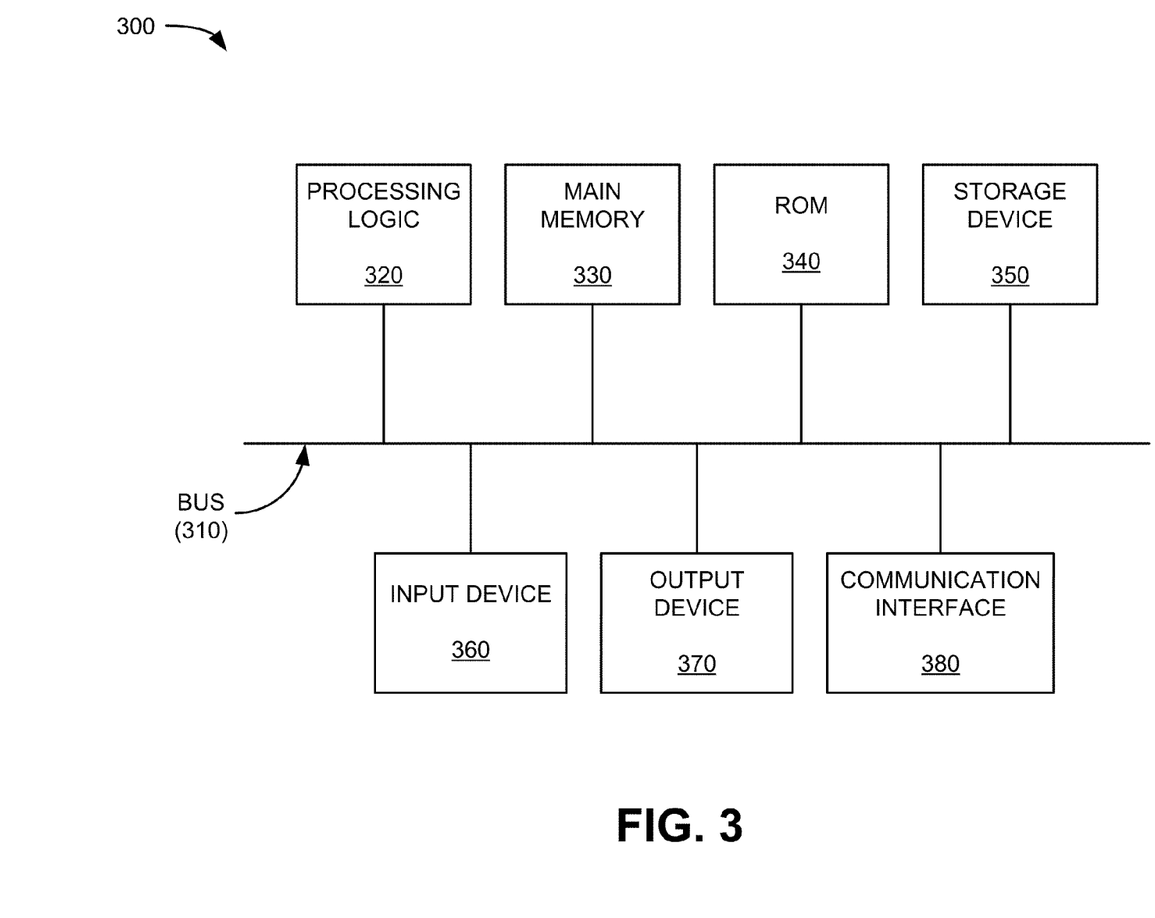
FIG. 3 illustrates exemplary components of a public safety answering point (PSAP), an emergency services gateway, a location engine, a user device, and/or a proxy server of the network depicted in FIG. 2.

FIG. 3 is an exemplary diagram of a device 300 that may correspond to PSAP 130, emergency services gateway 140, emergency server 150, location engine 160, user device 210, and/or proxy server 220. As illustrated, device 300 may include a bus 310, a processor 320, a main memory 330, a read-only memory (ROM) 340, a storage device 350, an input device 360, an output device 370, and/or a communication interface 380. Bus 310 may include a path that permits communication among the components of device 300.

Processor 320 may include a processor, microprocessor, or a type of processing logic (e.g., an application-specific integrated circuit (ASIC) or field-programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and/or instructions for use by processor 320. Storage device 350 may include a magnetic and/or optical recording medium and its corresponding drive, or a type of flash memory.

Input device 360 may include a mechanism that permits an operator to input information to device 300, such as a keyboard, a mouse, a pen, a microphone, a button, voice recognition and/or biometric mechanisms, a remote control, etc. Output device 370 may include a mechanism that outputs information to the operator, including a display, a speaker, a light-emitting diode (LED), etc. Communication interface 380 may include any transceiver-like mechanism that enables device 300 to communicate with other devices and/or systems. For example, communication interface 380 may include mechanisms for communicating with another device or system via a network, such as network 230 and/or wireless core network 120.

As described herein, device 300 may perform certain operations in response to processor 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently-arranged, or additional components than depicted in FIG. 3. Additionally, or alternatively, one or more components of device 300 may perform one or more other tasks described as being performed by one or more other components of device 300.

Figure 4:
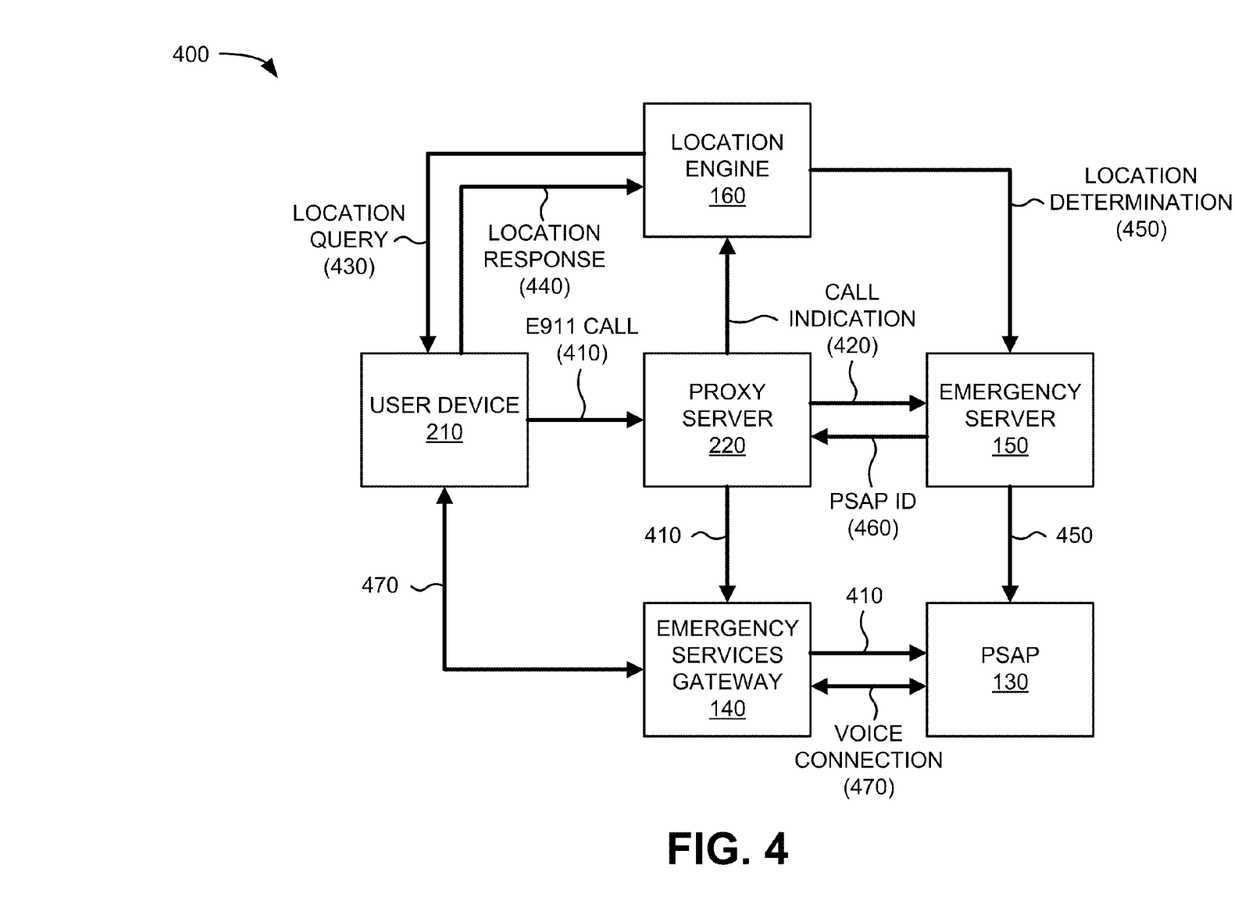
FIG. 4 depicts a diagram of a portion of the network depicted in FIG. 2, and exemplary interactions between components of the network portion during initiation of an E911 call.

FIG. 4 depicts a diagram of a portion 400 of network 200, and exemplary interactions between components of network portion 400 during initiation of an E911 call. As illustrated, network portion 400 may include user device 210, proxy server 220, PSAP 130, emergency services gateway 140, emergency server 150, and location engine 160. User device 210, proxy server 220, PSAP 130, emergency services gateway 140, emergency server 150, and location engine 160 may include features described above in connection with, for example, FIGS. 1-3.

As further shown in FIG. 4, user device 210 may initiate an emergency (E911) call 410 associated with an ANI, and proxy server 220 may receive E911 call 410. Proxy server 220 may send a call indication 420 to emergency server 150 and location engine 160. Call indication 420 may include, for example, the ANI of user device 210.

Location engine 160 may receive call indication 420. In response to call indication 420, location engine 160 may initiate actions to determine both a street address and a geographic location of user device 210. For example, location engine 160 may query an ALI database for street address information associated with the ANI of user device 210. Location engine 160 may also generate a query 430 (e.g., based on call indication 420) for a calling location (e.g., information regarding the current geographic location of user device 210), and may provide query 430 to user device 210 (e.g., via a wireless network portion of network 230). User device 210 may identify a current geographic position (e.g., using GPS, triangulation, etc.) and provide a response 440 with the geographic position information to location engine 160.

Location engine 160 may (if necessary) convert the street address information into geographic location information (e.g., latitude and longitude data) that may be compared with the geographic position information provided in response 440. Location engine 160 may calculate the difference between the street address data for user device 210 and the geographic position information provided in response 440 and determine which location information is most-relevant for the current E911 call (e.g., E911 call 410). Location engine 160 may provide a location determination 450 to emergency server 150.

Emergency server 150 may receive call indication 420 and location determination 450 and identify a correct PSAP 130 to receive E911 call 410. Emergency server 150 may forward location determination 450 to the correct PSAP 130 and may send a PSAP identifier (ID) 460 to proxy server 220 to indicate the correct PSAP 130 to receive E911 call 410. Proxy server 220 may then route E911 call 410, via emergency services gateway 140, to PSAP 130. PSAP 130 may receive the call and establish a voice connection 470 with user device 210. PSAP 160 may, in turn, provide the appropriate emergency services in a timely and efficient manner to the user of user device 210.

Although FIG. 4 shows exemplary components of network portion 400, in other implementations, network portion 400 may contain fewer components, different components, differently arranged components, or additional components than depicted in FIG. 4. Alternatively, or additionally, one or more components of network portion 400 may perform one or more other tasks described as being performed by one or more other components of network portion 400.

Figure 5:
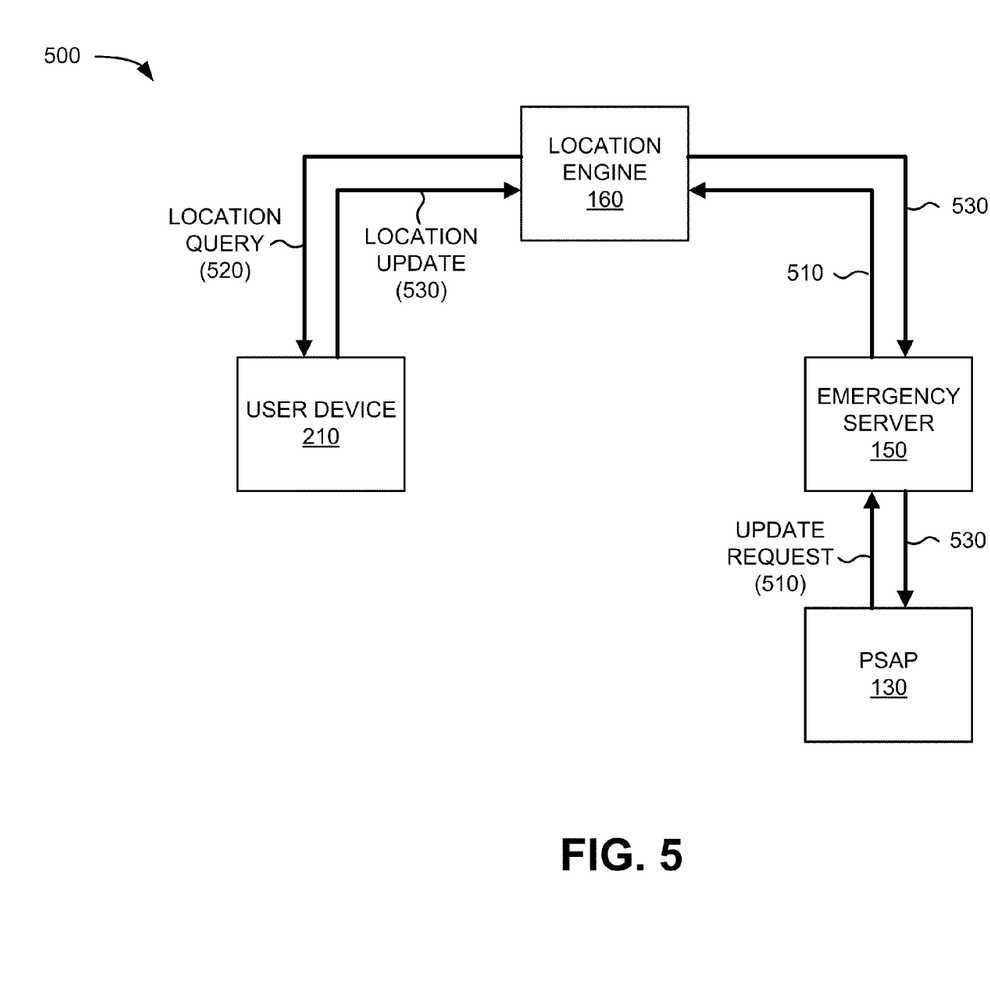
FIG. 5 depicts a diagram of another portion of the network depicted in FIG. 2, and exemplary interactions between components of the network portion subsequent to connection of an E911 call.

FIG. 5 depicts a diagram of a portion 500 of network 200, and exemplary interactions between components of network portion 500 subsequent to connection of an E911 call. As illustrated, network portion 500 may include user device 210, PSAP 130, emergency server 150, and location engine 160. User device 210, PSAP 130, emergency server 150, and location engine 160 may include features described above in connection with, for example, FIGS. 1-4.

As further shown in FIG. 5, PSAP 130 may request an update of the location of user device 210, as indicated by reference number 510. For example, during the E911 call, a PSAP operator may determine that an updated location of user device 210 is desired (e.g., if user device 210 is in a moving vehicle during the E911 call). Update request 510 may be provided to emergency server 150, which may forward update request 510 to location engine 160.

Location engine 160 may generate a location query 520 (e.g., based on update request 510) for a calling location (e.g., information regarding the current geographic location of user device 210), and may provide query 520 to user device 210 (e.g., via a wireless network portion of network 230). User device 210 may identify a current geographic position (e.g., using GPS, triangulation, etc.) and provide a response 530 with the geographic position information to location engine 160. Because response 530 is based on a request (e.g., update request 510) from an in-progress E911 call, location engine 160 may not perform a comparison of the received geographic position information and a corresponding street address. Instead, location engine 160 may simply forward the geographic position information of response 530 to emergency server 150. Emergency server 150 may then forward the updated position information of response 530 to the requesting PSAP 130.

Although FIG. 5 shows exemplary components of network portion 500, in other implementations, network portion 500 may contain fewer components, different components, differently arranged components, or additional components than depicted in FIG. 5. Alternatively, or additionally, one or more components of network portion 500 may perform one or more other tasks described as being performed by one or more other components of network portion 500.

Figure 6:
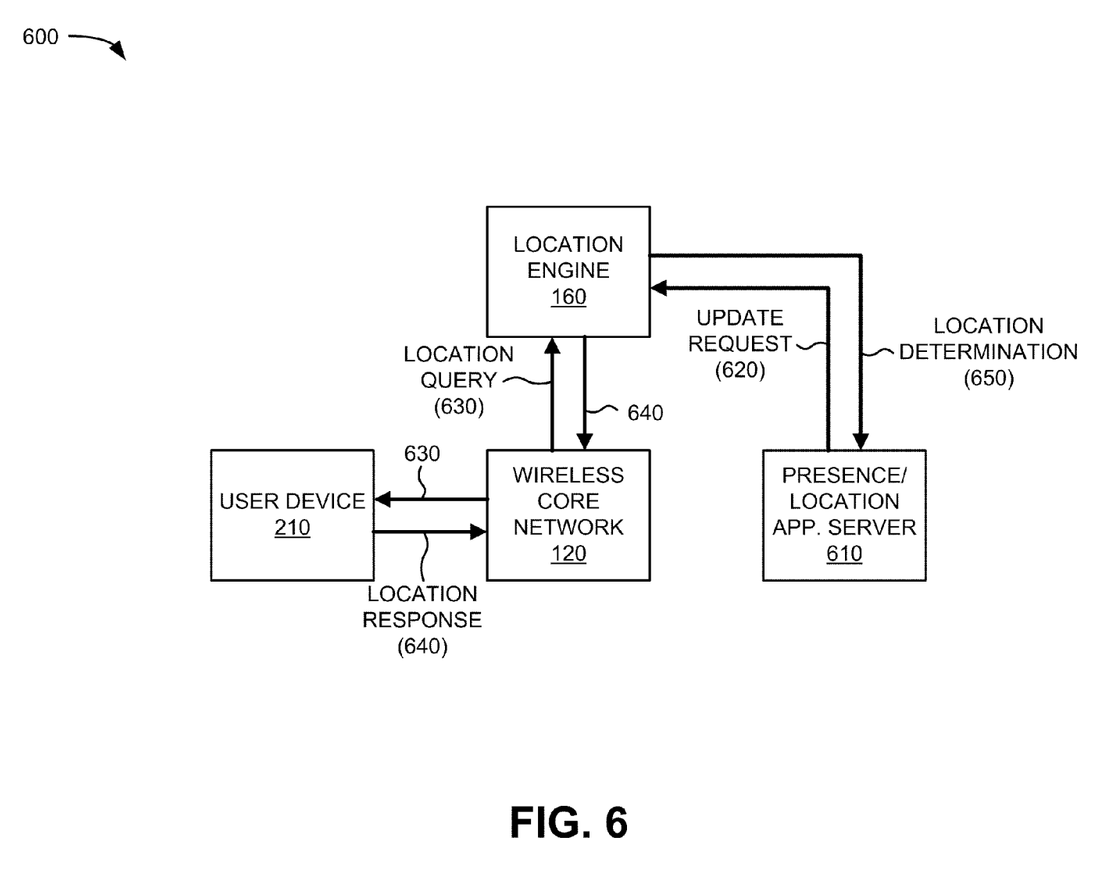
FIG. 6 depicts a diagram of still another portion of the network depicted in FIG. 2, and exemplary interactions between components of the network portion during use of presence and/or location based services.

FIG. 6 depicts a diagram of a portion 600 of network 200, and exemplary interactions between components of network portion 600 during use of presence and/or location based services. As illustrated, network portion 600 may include user device 210, wireless core network 120, location engine 160, and a presence/location application server 610. User device 210, wireless core network 120, and location engine 160 may include features described above in connection with, for example, FIGS. 1-5.

Presence/location application server 610 include one or more server devices, or other types of computation or communication devices, that gather, process, search, and/or provide information in a manner described herein. In one implementation, presence/location application server 610 may include one or more computing devices that provide services to user device 210. Presence/location application server 610 may include, for example, a web server that provides web pages to user device 210, an application server, a presence server, a navigation server, and/or additional types of servers.

As further shown in FIG. 6, presence/location application server 610 may request an update of the location of user device 210, as indicated by reference number 620. For example, in association with a particular service or software application, presence/location application server 610 may determine that an updated location of user device 210 is needed (e.g., based on a change in a presence indication by a user of user device 210, an explicit request by a user of user device 210 or another user, and/or as part of regularly scheduled updates). Update request 620 may be provided to location engine 160, and location engine 160 may initiate actions to determine both a street address and a geographic location of user device 210. For example, location engine 160 may query a location database for street address information associated with an account (e.g., an account associated with presence/location application server 610) for user device 210. Location engine 160 may also generate a location query 630 (e.g., based on update request 620) for a geographic location (e.g., information regarding the current geographic location of user device 210), and may provide query 630 to user device 210 (e.g., via wireless core network 120).

User device 210 may identify a current geographic position (e.g., using GPS, triangulation, etc.) and provide a location response 640 with the geographic position information to location engine 160 (via wireless core network 120). Location engine 160 may (if necessary) convert the street address information (e.g., retrieved from the location database) into geographic location information (e.g., latitude and longitude data) that may be compared with the geographic position information provided in location response 640. Location engine 160 may calculate the difference between the street address data for user device 210 and the geographic position information provided in location response 640 and determine which location information is most likely to be accurate/current for user device 210. Location engine 160 may provide a location determination 650 to presence/location application server 610. Location determination 650 may be used by presence/location application server 610 to facilitate requests for services via subsequent communications with, for example, user device 210 (not shown).

Although FIG. 6 shows exemplary components of network portion 600, in other implementations, network portion 600 may contain fewer components, different components, differently arranged components, or additional components than depicted in FIG. 6. Alternatively, or additionally, one or more components of network portion 600 may perform one or more other tasks described as being performed by one or more other components of network portion 600.

Figure 7:
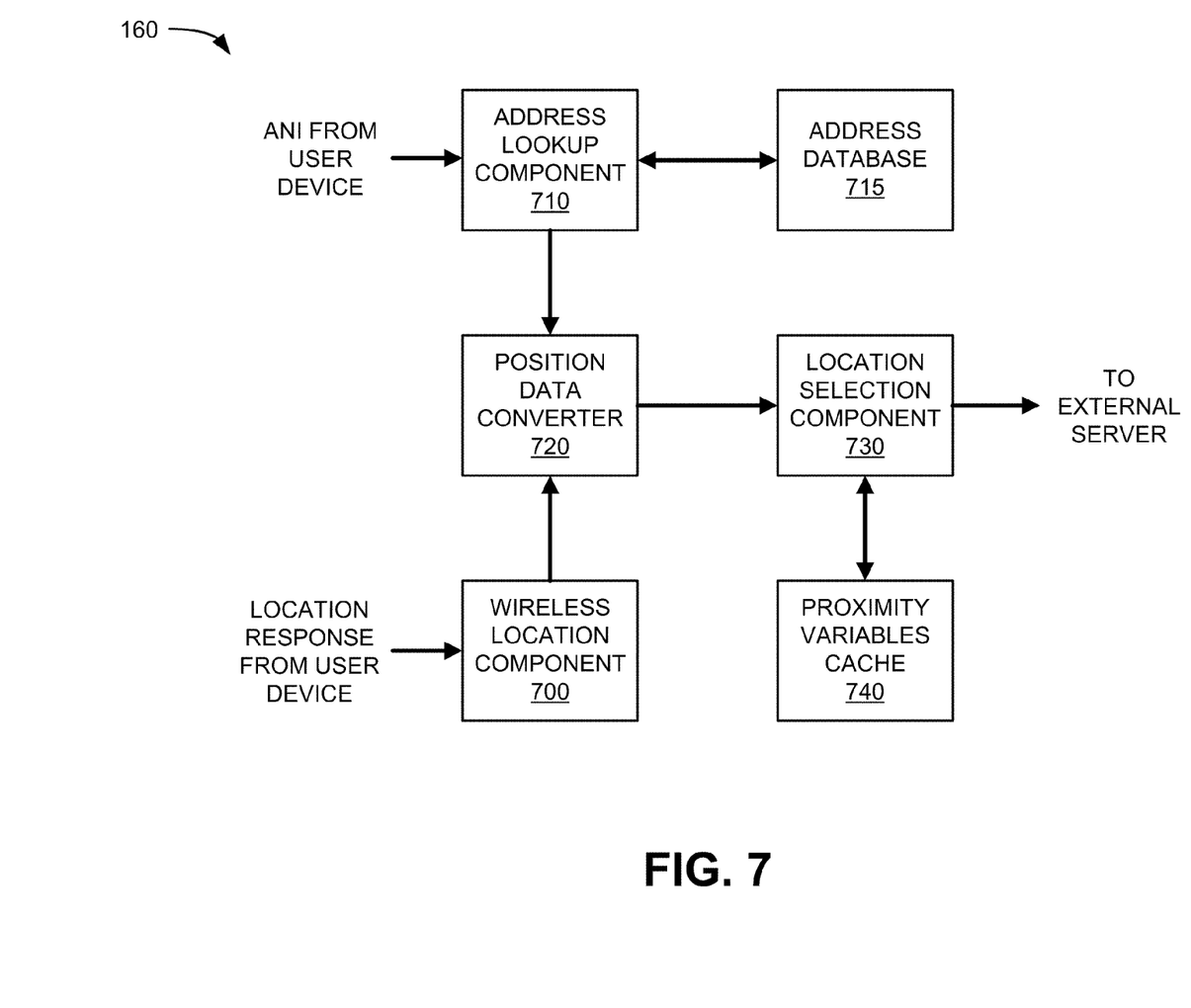
FIG. 7 depicts a diagram of exemplary functional components of the location engine of the network depicted in FIG. 2.

FIG. 7 depicts a diagram of exemplary functional components of location engine 160. As illustrated, location engine 160 may include a wireless location component 700, an address lookup component 710, an address database 715, a position data converter 720, a location selection component 730, and a proximity variables cache 740. The functions described in FIG. 7 may be performed by one or more of the exemplary components of device 300 depicted in FIG. 3.

Wireless location component 700 may include hardware or a combination of hardware and software to obtain real-time (or near real-time) geographic location information for a user device (e.g., user device 210). In one implementation, wireless location component 700 may receive a call indication (e.g., from proxy server 220) and initiate communications with user device 210 to retrieve parameters of location services deployed by a wireless service provider for user device 210. For example, wireless location component 700 may perform one or more queries with user device 210 to identify a best-available location determination method. The location of user device 210 may be determined, for example, based on one or a combination of technologies or techniques, such as GPS, GNSS, cellular positioning methods (e.g., triangulation, multilateration, etc.), local positioning methods (e.g., Bluetooth, IEEE 802.11, Ultra Wide Band), etc.

In one implementation, wireless location component 700 may include, or be in communication with, a position determining entity (PDE). The PDE may include one or more components to determine the position of user device 210 and/or to help user device 210 determine its own position. The PDE may, for example, track the position of GPS satellites through a network of stationary GPS receivers distributed across the coverage area of a wireless network (e.g., wireless core network 120). The PDE may, for example, determine an approximate location of user device 210 based on the signal from a local base station and provide user device 210 with the identities and positions of GPS satellites that are likely to be in range of user device 210. The PDE may support one or more position determining technologies or algorithms to gather location information.

Wireless location component 700 may determine a best-available position determining method for user device 210 and solicit geographic location information from user device 210 according to the selected position determining method. Wireless location component 700 may receive, from user device 210 (e.g., via location response 440), the geographic location information and the type of position determining method used, and forward the geographic location information and method to position data converter 720.

Address lookup component 710 may include hardware or a combination of hardware and software to identify a street address associated with a user device (e.g., user device 210). In one implementation, address lookup component 710 may include, or otherwise communicate with, address database 715 that stores address information associated with user device 210 (e.g., addresses associated with an ANI of user device 210). Address database 715 may include, for example, a third party Automatic Location Identification (ALI) database that is secure and separate from the public telephone network. In another implementation, address database may include another secure database of user addresses. In still other implementations, address database 715 may include both street addresses associated with user device ANIs (or other identifiers) and geographic position coordinates associated with each street address. Address lookup component 710 may query address database 715 for street address information (e.g., based on an ANI or other indication of user device 210), and may provide the received street address information to position data converter 720.

Position data converter 720 may include hardware or a combination of hardware and software to convert the geographic location information from wireless location component 700 and/or the street address information from address lookup component 710 into comparable data. In one implementation, position data converter 720 may convert GPS data and/or street address information (if necessary) into latitude and longitude coordinates. In other implementations, position data converter 720 may convert data from either wireless location component 700 or address lookup component 710 into a format for comparison with data from the other of wireless location component 700 or address lookup component 710.

Location selection component 730 may include hardware or a combination of hardware and software to determine whether to use a street address or a wireless position as the current location for a user device (e.g., user device 210). In one implementation, location selection component 730 may compare the formatted data from position data converter 720 to determine if the data from wireless location component 700 is consistent with (e.g., within a particular threshold of) data from address lookup component 710. If the street address data and the wireless location data are outside of a particular threshold distance, location selection component 730 may use the wireless location data as the current location of user device 210. If the street address data and the wireless location data are within the particular threshold distance, location selection component 730 may use the street address data as the current location of user device 210. Location selection component may send the selected location to the appropriate server (e.g., emergency server 150 or presence/location application server 610).

The particular threshold distance value applied by location selection component 730 may vary depending upon the type of position determining method used to determine the wireless location data and/or the type of location based on the street address. In one implementation, location selection component 730 may retrieve an appropriate threshold distance value from proximity variables cache 740. In another implementation, the appropriate threshold distance value may be received from user device 210 (e.g., user device 210 may be configured to provide appropriate threshold distance values based on the best-available position determining method for user device 210).

Proximity variables cache 740 may include one or more memories (e.g., main memory 330 or storage device 350 of FIG. 3) to store location-related threshold values. Values may be provided, for example, by a wireless service operator and selected by location selection component 730 based on the type of location information received from wireless location component 700 and/or address lookup component 710. As noted above, a variety of technologies may be used to determine a position of user device 210. These technologies may provide a geographic position with different degrees of precision or accuracy. In one implementation, location selection component 730 may select a particular location-related threshold value based on the type of position determining method used by user device 210 and indicated to wireless location component 700. In another implementation, location selection component 730 may select a particular location-related threshold value based on the type of position determining method and the type of location identified in the street address (e.g., rural, suburban, city, etc.). Proximity variables cache 740 is discussed further in connection with FIG. 8.

Although FIG. 7 shows exemplary functional components of location engine 160, in other implementations, location engine 160 may contain fewer components, different components, differently arranged components, or additional components than depicted in FIG. 7. Alternatively, or additionally, one or more functional components of location engine 160 may perform one or more other tasks described as being performed by one or more other functional components of location engine 160.

Figure 8:
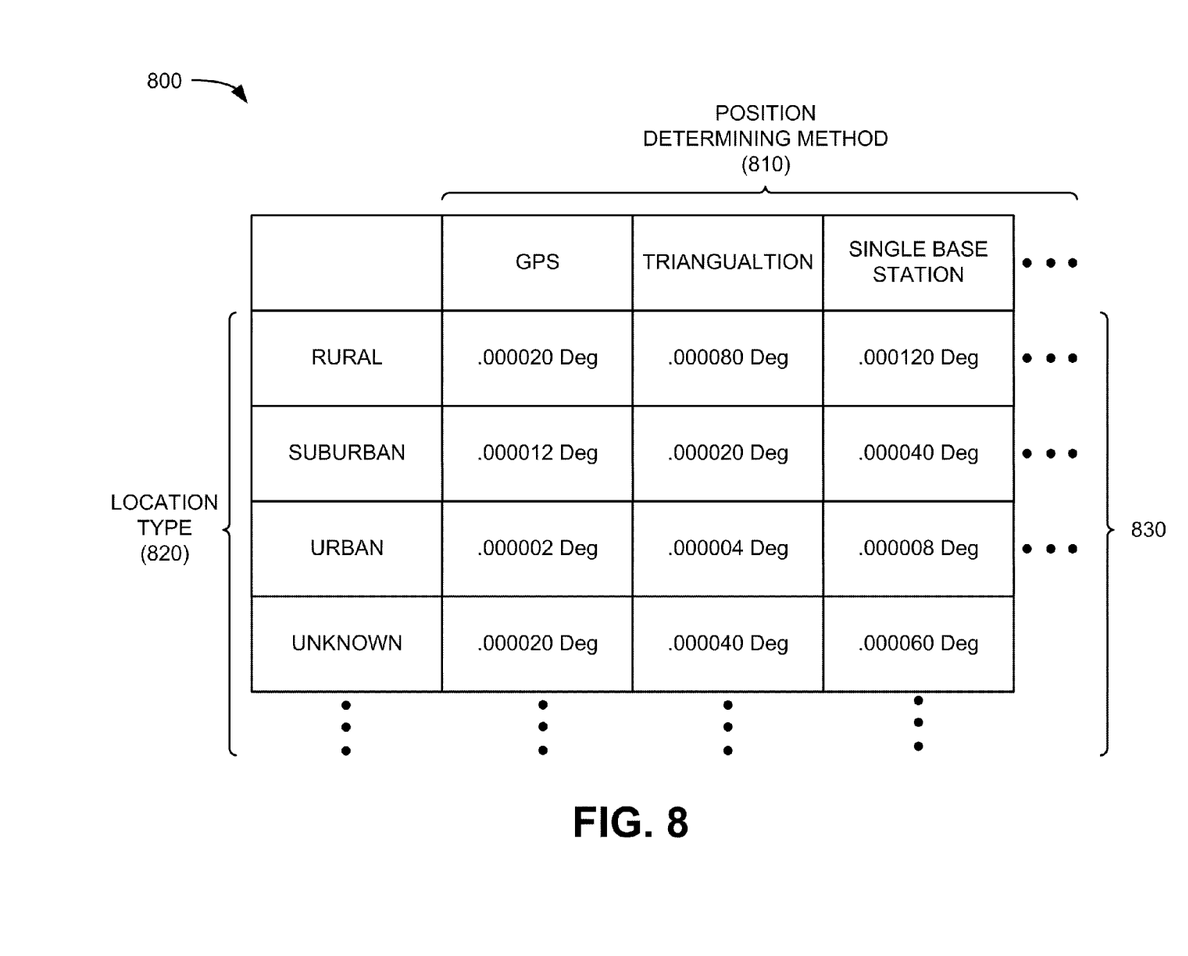
FIG. 8 illustrates a diagram of an exemplary portion of a data structure for proximity variables used by the location engine.

FIG. 8 illustrates a diagram of an exemplary portion of a data structure 800 for proximity variables cache 740. As shown, data structure 800 may include a column headings 810 corresponding to position determining methods, row headings 820 corresponding to location type, and a variety of entries 830 associated with column headings 810 and row headings 820.

Column headings 810 may include various position determining methods that may be used to obtain wireless location information from user device 210. As shown in FIG. 8, methods may include "GPS," "Triangulation," and "Single Base Station." Other methods or subsets of methods may also be included in column headings 810. For example, GPS may be broken out into other GPS-related technologies, such as assisted GPS (AGPS), differential GPS (DGPS), wide-area augmentation system (WAAS). In another implementation, column headings 810 may include particular services and/or equipment manufacturers.

Rows headings 820 may include various location types that may relate to street addresses associated with a user device. As shown in FIG. 8, row headings 820 may include "Rural," "Suburban," "Urban," and "Unknown" (i.e., default). The headings "Rural," "Suburban," and "Urban" are provided for illustrative purposes. In practice, particular zip codes, counties, or other information from street addresses may be included in row headings 820. Other location types may be used in row headings 820. For example, particular states or regions may be grouped within row headings 820. Generally, row headings 820 may distinguish between, for example, densely-populated regions and more sparsely-populated regions.

Each of entries 830 may include threshold distance values associated with a particular location determining method and location type. As shown in FIG. 8, entries 830 may each include a single degree value that may correspond to latitude and longitude threshold. In other implementations, separate degree values may be provided for latitude and longitude. In still other implementations, entries 830 may include other types of distance threshold values, such as meters, yards, miles, etc.

In operation, location selection component 730 may identify a column heading 810 associated with the position determining method used to identify the location of user device 210 (e.g., "GPS") and may identify a row heading associated with the particular location type from a street address corresponding to user device 210 (e.g., "Urban"). Location selection component 730 may identify the value of the entry 830 corresponding to the column heading and row heading (e.g., "0.000002 Deg"), and apply that value as the location-related threshold value used to determine whether a street address or wireless location address should be selected as the current address of user device 210.

Although FIG. 8 shows exemplary information that may be provided in data structure 800, in other implementations, data structure 800 may contain less, different, differently arranged, or additional information than depicted in FIG. 8. For example, in some implementations, data structure 800 may include only column headings 810 associated with various position determining methods or only row headings 820 associated with location types. Thus, location selection component 730 may select from different values associated with different position determining methods, from different values associated with different location types, or from different values associated with different combinations of position determining methods and location types.

Figure 9:
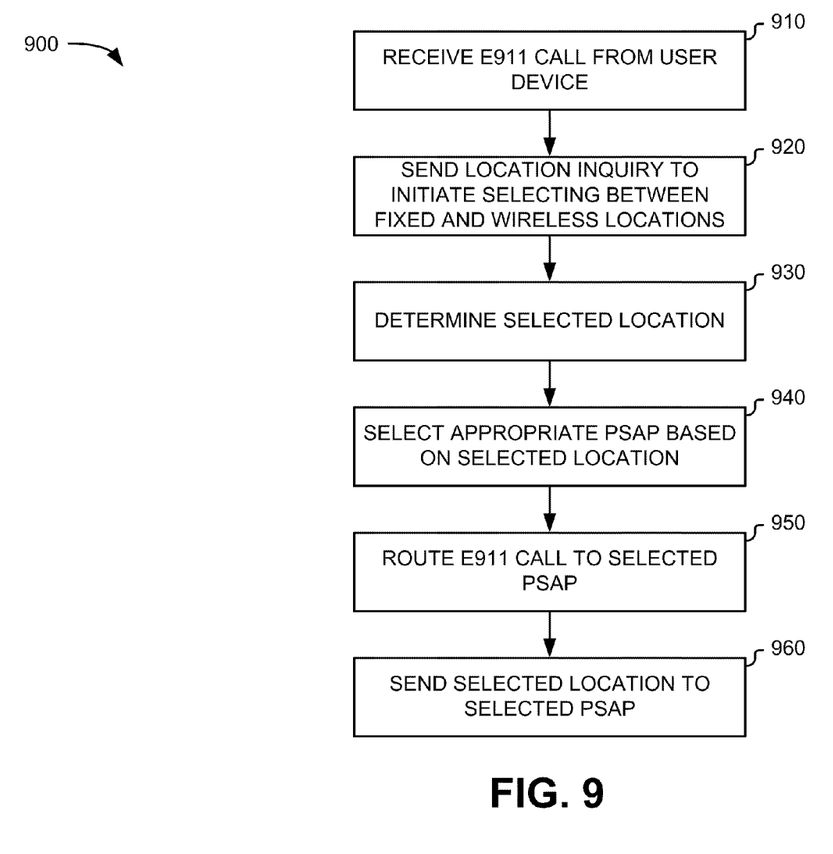
FIGS. 9 and 10 depict flow charts of exemplary processes according to implementations described herein.
Figure 10:
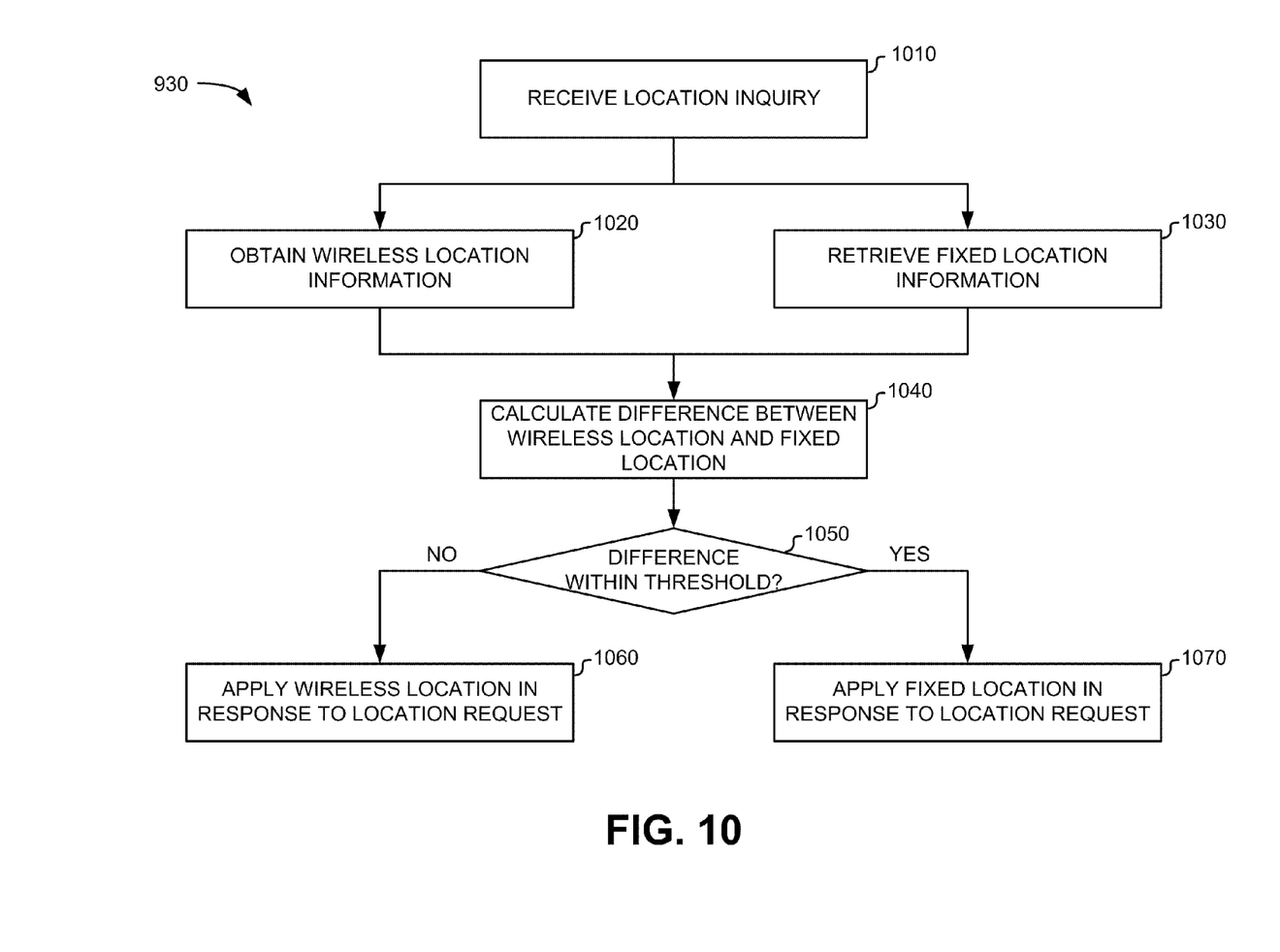

FIGS. 9 and 10 provides a process flow 900 illustrating exemplary operations for routing E911 calls based on location determinations of fixed wireless terminals. In one implementation, the operations of process flow 900 may be performed by one or more devices associated with network 200, such as proxy server 220, emergency server 150, and/or location engine 160. In another implementation, some or all of the operations of process flow 900 may be performed by another device or group of devices in conjunction with one or more of proxy server 220, emergency server 150, and/or location engine 160.

Process 900 may include receiving an E911 call from a user device (block 910) and sending a location inquiry to initiate selecting between fixed and wireless locations (block 920). For example, as described above in connection with FIG. 4, user device 210 may initiate an emergency (E911) call 410 associated with an ANI, and proxy server 220 may receive E911 call 410. Proxy server 220 may send a call indication 420 to emergency server 150 and location engine 160. Call indication 420 may include, for example, the ANI of user device 210.

Returning to FIG. 9, a selected location may be determined (block 930) and an appropriate PSAP may be selected based on the selected location (block 940). For example, as described above in connection with FIG. 4, location engine 160 may receive call indication 420. In response to call indication 420, location engine 160 may initiate actions to determine both a street address and a geographic location of user device 210. Location engine 160 may calculate the difference between the street address data for user device 210 and the geographic position information provided in response 440 and determine which location information is most-relevant for the current E911 call (e.g., E911 call 410). Location engine 160 may provide a location determination 450 to emergency server 150.

Returning again to FIG. 9, the E911 call may be routed to the selected PSAP (block 950) and the selected location may be sent to the selected PSAP (block 960). For example, as described above in connection with FIG. 4, emergency server 150 may receive call indication 420 and location determination 450 and identify a correct PSAP 130 to receive E911 call 410. Emergency server 150 may forward location determination 450 to the correct PSAP 130 and may send PSAP identifier (ID) 460 to proxy server 220 to indicate the correct PSAP 130 to receive E911 call 410. Proxy server 220 may then route E911 call 410, via emergency services gateway 140, to PSAP 130.

Process block 930 may include the process blocks depicted in FIG. 10. As shown in FIG. 10, process block 930 may include receiving a location inquiry (block 1010), obtaining wireless location information (block 1020), and retrieving fixed location information (block 1030). For example, as described above in connection with FIG. 7, wireless location component 700 may receive a call indication (e.g., from proxy server 220) and initiate communications with user device 210 to retrieve parameters of location services deployed by a wireless service provider for user device 210. Wireless location component 700 of location engine 160 may determine a best-available position determining method for user device 210 and solicit geographic location information from user device 210 according to the selected position determining method. Wireless location component 700 may receive, from user device 210 (e.g., via location response 440), the geographic location information and the type of position determining method used, and forward the geographic location information and method to position data converter 720. Also, address lookup component 710 may query address database 715 for street address information (e.g., based on an ANI or other indication of user device 210), and may provide the received street address information to position data converter 720.

Returning to FIG. 10, process block 930 may further include calculating the difference between the wireless location and the fixed location (block 1040) and determining if the difference is within a particular threshold (block 1050). For example, as described above in connection with FIG. 7, position data converter 720 may convert data from either wireless location component 700 or address lookup component 710 into a format for comparison with data from the other of wireless location component 700 or address lookup component 710. Location selection component 730 may compare the formatted data from position data converter 720 to determine if the data from wireless location component 700 is consistent with (e.g., within a particular threshold) data from address lookup component 710. The particular threshold distance value applied by location selection component 730 may vary depending upon the type of position determining method used to determine the wireless location data and/or the type of location based on the street address. In one implementation, location selection component 730 may retrieve an appropriate threshold distance value from proximity variables cache 740.

If the difference is not within the particular threshold (block 1050—NO), the wireless location may be applied in response to the location request. For example, as described above in connection with FIG. 7, if the street address data and the wireless location data are outside of a particular threshold distance, location selection component 730 may use the wireless location data as the current location of user device 210. If the difference is within the particular threshold (block 1050—YES), the fixed location may be applied in response to the location request. For example, if the street address data and the wireless location data are within the particular threshold distance, location selection component 730 may use the street address data as the current location of user device 210.

Location selection component may send the selected location to the appropriate server (e.g., emergency server 150 or presence/location application server 610).

Implementations described herein may provide systems and/or methods that may receive a location inquiry for a user device, the location inquiry including an identifier for the user device, and may retrieve fixed location data associated with the identifier. The systems and/or methods may also obtain, from the user device, current geographic location data for the user device and may calculate a difference between the fixed location data and the current geographic location data. The systems and/or methods may select, from a group of threshold values, a particular threshold value for assessing the calculated difference between the fixed location data and the current geographic location data. The systems and/or methods may respond to the location inquiry using the fixed location data when the difference between the fixed location data and the geographic location data is within the particular threshold and may otherwise respond to the location inquiry using the current geographic location data.

Applied to E911 calling services, systems and/or methods described herein may permit calculation of a value user device location and correcting/overwriting a previously-stored street address. Furthermore, if the user device is moved from the street-address on file, the call can be directed to correct PSAP instead of one based on the previously-stored street address. Also, if the user device is within a moving vehicle, the PSAP can get updated location information when needed.

Applied to non-emergency services, systems and/or methods described herein may enable a mobile user to search for a local business location (e.g., business, hospital, airport, etc.) based on a current geographic location, instead of the previously-stored street address. Furthermore, social networking features may be enhanced by automatically correcting a user device location and/or indicators of a location.

The foregoing description provides illustration and description, but is not intended to be exhaustive or to limit the implementations to the precise form disclosed. Modifications and variations are possible in light of the above teachings or may be acquired from practice of systems and/or methods disclosed herein.

For example, while series of blocks have been described with regard to FIGS. 9 and 10, the order of the blocks may be modified in other implementations. Further, non-dependent acts may be performed in parallel.

It will be apparent that aspects, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    receiving, by one or more devices, a location inquiry for a user device that initiated an emergency call,
        the location inquiry including an identifier for the user device;
    determining, by the one or more devices, fixed location data associated with the identifier;
    obtaining, by the one or more devices and from the user device, current geographic location data associated with the user device;
    calculating, by the one or more devices, a difference based on the fixed location data and the current geographic location data;
    selecting, by the one or more devices, a particular threshold based on at least one of:
        a type of a position determining method used by the user device to determine the current geographic location data, or
        a type of location identified in the fixed location data;
    determining, by the one or more devices, whether the difference satisfies the particular threshold;
    providing, by the one or more devices, a response to the location inquiry based on the current geographic location data when the difference satisfies the particular threshold; and
    providing, by the one or more devices, the response to the location inquiry based on the fixed location data when the difference does not satisfy the particular threshold,
        the response being used to route the emergency call to a particular answering point,
        the particular answering point being a first answering point that is associated with the current geographic location data when the difference satisfies the particular threshold,
        the particular answering point being a second answering point that is associated with the fixed location data when the difference does not satisfy the particular threshold, and
        the first answering point being different from the second answering point.

2. The method of claim 1, where the fixed location data includes a street address designated by a subscriber for services for the user device.

3. The method of claim 1, where the current geographic location data associated with the user device includes one or more of:
    geographic coordinates from a global positioning system (GPS);
    geographic coordinates based on cellular tower triangulation; or
    geographic coordinates of a base station receiving signals from the user device.

4. The method of claim 1, where the identifier for the user device is one of:
    an automatic number identification (ANI) associated with the user device; or
    a calling party number (CPN) associated with the user device.

5. The method of claim 1, where determining the fixed location data comprises:
    retrieving the fixed location data from an automatic location identification (ALI) database that is separate from a public telephone network.

6. The method of claim 1, where obtaining the current geographic location data comprises:
   determining the position determining method;
   requesting the current geographic location data based on the position determining method; and
   receiving the current geographic location data.

7. The method of claim 1, where selecting the particular threshold includes:
   selecting a value, from a plurality of available values, for the particular threshold based on the type of the position determining method.

8. The method of claim 7, where the data structure of available values includes one of:
   different values associated with different position determining methods that include the position determining method, or
   different values associated with different combinations of:
   the position determining methods, and
   location types that include the type of location.

9. The method of claim 1, where calculating the difference includes:
   converting the fixed location data into a particular format of the current geographic location data, and
   calculating the difference based on the fixed location data that is converted into the particular format and the current geographic location data.

10. A system comprising:
    one or more processors to:
    receive a location inquiry for a user device that initiated an emergency call,
       the location inquiry including an identifier for the user device;
    determine fixed location data associated with the identifier;
    obtain, from the user device, current geographic location data associated with the user device;
    calculate a difference based on the fixed location data and the current geographic location data;
    select a particular threshold based on at least one of:
       a type of position determining method used by the user device to determine the current geographic location data, or
       a type of location identified in the fixed location data;
    determine whether the difference satisfies the particular threshold,
    provide a response to the location inquiry based on the fixed location data when the difference does not satisfy the particular threshold, and
    provide the response based on the current geographic location data when the difference satisfies the particular threshold,
       the response being used to route the emergency call to a particular answering point,
       the particular answering point being a first answering point that is associated with the current geographic location data when the difference satisfies the particular threshold,
       the particular answering point being a second answering point that is associated with the fixed location data when the difference does not satisfy the particular threshold, and
       the first answering point being different from the second answering point.

11. The system of claim 10,
    where the fixed location data associated with the identifier includes a street address designated by a subscriber for services for the user device, and
    where the current geographic location data associated with the user device includes one or more of:
       geographic coordinates from a global positioning system (GPS);
       geographic coordinates based on cellular tower triangulation; or
       geographic coordinates of a base station receiving signals from the user device.

12. The system of claim 10, where, when determining the fixed location data, the one or more processors are to:
    retrieve the fixed location data from an automatic location identification (ALI) database that is secure and separate from a public telephone network.

13. The system of claim 10, where, when obtaining, the current geographic location data, the one or more processors are to:
    determine the position determining method,
    request the current geographic location data from the user device based on the position determining method, and
    receive the current geographic location data from the user device.

14. The system of claim 10, where, when selecting the particular threshold, the one or more processors are to:
    select the particular threshold from a group of threshold values that include one of:
       different values associated with different position determining methods that include the position determining method, or
       different values associated with different combinations of:
       the different position determining methods, and
       location types that include the type of location.

15. A system comprising:
    one or more servers to:
    receive a location inquiry for a wireless device,
       the location inquiry including an identifier for the wireless device;
    identify previously-stored location data associated with the identifier;
    identify current geographic location data for the wireless device;
    determine a difference based on the previously-stored location data and the current geographic location data
    determine a threshold based on at least one of:
       a type of a position determining method used by the wireless device to determine the current geographic location data, or
       a type of location identified in the previously-stored location data determine whether the difference satisfies the threshold;
    provide a response to the location inquiry based on the previously-stored location data when the difference does not satisfy the threshold; and
    provide the response based on the current geographic location data when the difference satisfies the threshold,
       the response being used to route a call from the wireless device to a public service answering point (PSAP),
       the PSAP being a first answering point that is associated with the current geographic location data when the difference satisfies the threshold,
       the PSAP being a second answering point that is associated with the previously-stored location data when the difference does not satisfy the threshold, and the first answering point being different from the second answering point.

16. The system of claim 15, where, when identifying the current geographic location data, the one or more servers are to:
   determine a position determining method for the wireless device;
   request the current geographic location data from the wireless device based on the position determining method, and
   receive the current geographic location data from the wireless device.

17. The system of claim 16,
   where, when determining the threshold, the one or more servers are to:
      select a value, from a data structure of available values, for the threshold based on the position determining method, and
   where the previously-stored location data includes a street address.

18. The system of claim 15, where the one or more servers are further to:
   receive an emergency call from the wireless device; and
   provide the location inquiry based on the emergency call;
   receive the response; and
   select the PSAP, from a group of PSAPs, based on the response,
      the group of PSAPs including the first answering point and the second answering point.

19. A non-transitory computer-readable storage medium storing instructions, the instructions comprising:
   one or more instructions that, when executed by at least one processor of a first network device, cause the at least one processor to:
      receive a location inquiry for a user device that initiated an emergency call,
         the location inquiry including an identifier for the user device;
      determine location data associated with the identifier;
      determine a current geographic position of the user device;
      determine a difference based on the location data and the current geographic position;
      select a particular threshold based on at least one of:
         a type of position determining method used by the user device to determine the location data, or
         a type of location identified in the location data;
      determine whether the difference satisfies the particular threshold;
      provide a response based on the current geographic position when the difference satisfies the particular threshold; and
      provide the response based on the location data when the difference does not satisfy the particular threshold,
         the response being used to route the emergency call to a particular answering point,
         the particular answering point being a first answering point that is associated with the current geographic position when the difference satisfies the particular threshold,
         the particular answering point being a second answering point that is associated with the location data when the difference does not satisfy the particular threshold, and
         the first answering point being different from the second answering point.

20. The non-transitory computer-readable storage medium of claim 19, where the one or more instructions to select the particular threshold value include:
   one or more instructions that, when executed by the at least one processor, cause the at least one processor to:
      identify the position determining method; and
      select, based on the position determining method, the particular threshold from a group of threshold values.

21. The non-transitory computer-readable storage medium of claim 19, where the location data includes a fixed street address associated with the user device.

22. The non-transitory computer-readable storage medium of claim 19, where the one or more instructions to determine the location data include:
   one or more instructions that, when executed by the at least one processor, cause the at least one processor to:
      retrieve the location data from an automatic location identification (ALI) storage component that is secure and separate from a public telephone network.

* * * * *